United States Patent
Lyall et al.

[19]

[11] Patent Number: 5,971,003
[45] Date of Patent: Oct. 26, 1999

[54] APPARATUS TO SERVICE GAS METERS

[75] Inventors: Jeff Lyall, Orange; Dan P. Zapalac, Corona, both of Calif.

[73] Assignee: R. W. Lyall & Company, Inc., Corona, Calif.

[21] Appl. No.: 09/026,176

[22] Filed: Feb. 19, 1998

[51] Int. Cl.[6] ................................................. F16K 11/07
[52] U.S. Cl. ...................................... 137/112; 137/599.1
[58] Field of Search .................................. 137/110, 112, 137/599.1

[56] References Cited

U.S. PATENT DOCUMENTS

| | | | |
|---|---|---|---|
| 2,106,822 | 2/1938 | White | 137/112 |
| 2,579,656 | 12/1951 | Douglas et al. . | |
| 3,148,690 | 9/1964 | Petersen . | |
| 3,173,295 | 3/1965 | Magleby . | |
| 3,187,570 | 6/1965 | Mueller . | |
| 3,245,257 | 4/1966 | Anderson . | |
| 3,296,861 | 1/1967 | Mueller et al. . | |
| 3,399,694 | 9/1968 | Vinson . | |
| 3,444,724 | 5/1969 | Gilpin . | |
| 3,687,153 | 8/1972 | Gold | 137/112 |
| 3,894,432 | 7/1975 | Coughlin . | |
| 4,257,452 | 3/1981 | Hill et al. . | |
| 4,291,719 | 9/1981 | Lehmann | 137/112 |
| 4,369,808 | 1/1983 | Hagman . | |
| 4,369,809 | 1/1983 | Euerle . | |
| 4,498,497 | 2/1985 | Rosaen . | |
| 4,612,962 | 9/1986 | Purvis . | |
| 5,010,916 | 4/1991 | Albrecht . | |
| 5,042,528 | 8/1991 | England, et al. . | |
| 5,178,188 | 1/1993 | Russell . | |
| 5,287,886 | 2/1994 | Russell . | |
| 5,437,300 | 8/1995 | Winnie et al. . | |
| 5,482,073 | 1/1996 | Winnie et al. . | |
| 5,654,505 | 8/1997 | Jiles . | |

Primary Examiner—Stephen M. Hepperle
Attorney, Agent, or Firm—Fulwider Patton Lee & Utecht, LLP

[57] ABSTRACT

A bypass valve is connected in line with the distribution line of a gas meter and includes a cylindrical housing with an inlet port connected to the distribution line, an outlet port connected to the gas consumer, and a poppet cage defined by two annular seats disposed internally between the two ports and formed with flow apertures. The housing is formed with an auxiliary port disposed between the inlet port and the outlet port. A threaded fitting for connecting to an auxiliary gas source extends through the auxiliary port and connects to the outlet seat of the cage. A cylindrical poppet is slidably disposed within the cage and is biased against the outlet seat by a coil spring interposed between the poppet and the inlet seat.

17 Claims, 4 Drawing Sheets

APPARATUS TO SERVICE GAS METERS

BACKGROUND OF THE INVENTION

1. Field of the Invention

The present invention relates to servicing gas meters, and more particularly to a bypass valve for providing uninterrupted gas service to a consumer while the gas meter is being serviced.

2. Description of the Prior Art

Gas meters are typically installed on the supply line leading to a residential or commercial consumer and are mounted above ground outside the consumer's building. The meters are thus exposed to the elements and over time suffer some degradation. For this reason, as well as to comply with various governmental codes and regulations, meters must be replaced periodically, usually every ten to fifteen years. Replacing a gas meter has always been a problematic task, especially for residential consumers, because numerous appliances such as water heaters and cooking stoves are equipped with pilot lights that are constantly supplied with gas and thus do not come equipped with shut off valves or automatic pilot light ignition devices. For this reason, when a gas meter is changed the gas service is temporarily shut off and all pilot lights inside the consumer's building are extinguished. Following replacement or service of the meter, the pilot lights must be individually reignited once the gas supply is reestablished and before sufficient gas is released to pose any danger. Thus, the consumer must be present or the gas company employee must be able to gain access into the building to reignite the pilot lights any time a meter is serviced or replaced.

One solution to this problem is to continue to supply gas service to the consumer while the meter is being serviced. Various methods have been proposed in a number of different patents to achieve this goal. A particularly cumbersome method is disclosed in U.S. Pat. No. 3,148,690 to Petersen, wherein a T-fitting is connected between the gas meter and the consumer. During the change out a plastic bag is placed over the T-fitting, a plug sealing the uncoupled end of the fitting is removed, and a probe connected to a gas supply tank is manipulated through the bag to be coupled with the T-fitting and thus supply gas to the consumer while the line from the meter is sealed off. The method of U.S. Pat. No. 3,173,295 to Magleby employs two T-fittings attached to the inlet and the outlet ports of the gas meter, respectively, so as to allow a bypass tube to be connected to the uncoupled end of each T-fitting and thus allow supply line gas to flow around the meter while it is being serviced. This method requires additional equipment installed such as a second T-fitting and mechanisms for shutting off the flow to the meter and thus is not very cost effective.

In U.S. Pat. No. 3,245,257 to Anderson, a T-fitting with an internal two-way valve that can be manually displaced by a plunger to seal off either of two inlets is installed on the distribution side of the gas meter. To service the meter, an uncoupled end of the fitting is unsealed and a plunger assembly including an inlet port connected to an auxiliary gas supply is coupled to the inlet port. The plunger is displaced by pressure from the auxiliary gas supply to move the valve and seal off the inlet from the gas meter. Removing the plug that seals off the uncoupled end of the fitting results in a momentary escape of gas flowing from the meter, with a resultant drop in the gas pressure affecting the consumer gas equipment which may cause the pilot lights to be extinguished and thus defeat the very purpose of the device. A relatively similar arrangement is also disclosed in U.S. Pat. No. 6,654,505 to Jiles.

Another method, disclosed in U.S. Pat. No. 5,287,886 to Russell, employs an override valve installed in series with the gas meter distribution line and including a first ball disposed over the valve inlet and a second ball loosely held in a cage interposed in the flow path of the gas supply. A port in the side of the valve is pneumatically connected to the cage to supply auxiliary gas. During normal operation, the gas pressure in the valve drives the first ball out of the valve inlet to allow gas to flow by, and forces the second ball in the cage to move outward to seal off the side port. During a meter change out, an auxiliary supply is connected to the port to provide gas at a pressure exceeding the service line pressure, thus driving the second ball away from the side port and the first ball against the inlet to seal off the gas flow from the meter. This device appears to be adapted for installation in a vertical orientation only, as the first ball appears to require the aid of gravity to correctly position itself over the valve inlet. In addition, the second ball may be manually displaced during normal operation by inserting a screwdriver or similar device, thus allowing the release of the gas from the line and an interruption of service to the user.

Finally, in U.S. Pat. No. 5,437,300, Winnie et al. propose a bypass valve with a cage similar to the Russell valve, and connected pneumatically to a side port through an elbow fitting. The cage is formed with ports in its side wall and a cylindrical poppet with two flat ends is loosely disposed within the cage to be driven against the elbow fitting inlet by the supply line pressure. When a change out is performed, auxiliary gas at higher pressure than the supply gas is introduced through the elbow fitting to drive the poppet against the other end of the cage and thus seal off the primary gas flow and continue to supply the auxiliary gas to the consumer. Unfortunately, the poppet of this design is prone to freezing, sticking, and jamming in the cage due to factors such as moisture in the line freezing in cold weather, fine dust and other particulates in the line, and the uncontrolled freedom of movement of the poppet within the cage which results in a fluttering motion of the poppet under normal gas flow conditions.

Therefore, the need continues to exist for an apparatus that will ensure a continuous, uninterrupted supply of gas to a consumer while the gas meter is being serviced or replaced and that will successfully withstand the rigors of exposure to the elements, will continue to function without deterioration over extended periods of time, and is configured in a simple, compact, cost effective assembly.

SUMMARY OF THE INVENTION

The present invention meets this need by providing a bypass valve apparatus to be connected serially on a gas meter distribution line leading to the consumer. The valve of the present invention allows gas to flow through from the meter to the consumer during normal operation, and may be connected to an auxiliary gas source to continue to supply the auxiliary gas to the consumer while simultaneously shutting off the main gas flow from the gas meter during servicing or change out of the meter.

The present invention preferably includes a cylindrical housing with axially opposed inlet and outlet ports and an auxiliary port bored laterally into the wall of the housing. A poppet cage with annular seats and lateral gas flow apertures is mounted internally between the two ports and is connected through a fitting at its lower seat to the auxiliary port. A cylindrical poppet slides within the cage and is biased by a coil spring against the lower seat of the cage to seal off the auxiliary port during normal operation and allow the main gas flow to course through the flow apertures and out to the consumer. When sufficient gas pressure is applied to the auxiliary port to overcome the force of the spring and the pressure of the main gas flow, the poppet is driven against the upper seat of the cage to seal off the main gas flow from the gas meter and allow the auxiliary gas to flow through the flow apertures to the consumer, at which time the main gas flow can be shut off and the gas meter serviced or replaced.

It is an object of the present invention to provide a coil spring that surrounds the cage and is interposed between the upper end of the cage and the poppet. It is a farther object of the present invention to provide a poppet with tabs extending radially outward through the flow apertures to engage the coil spring. The auxiliary port fitting is preferably formed with a threaded nipple to be conveniently coupled to the auxiliary gas source.

Other features and advantages of the invention will become apparent from the following detailed description, taken in conjunction with the accompanying drawings, which illustrate, by way of example, the features of the invention.

DETAILED DESCRIPTION OF THE PREFERRED EMBODIMENT

Figure 1:
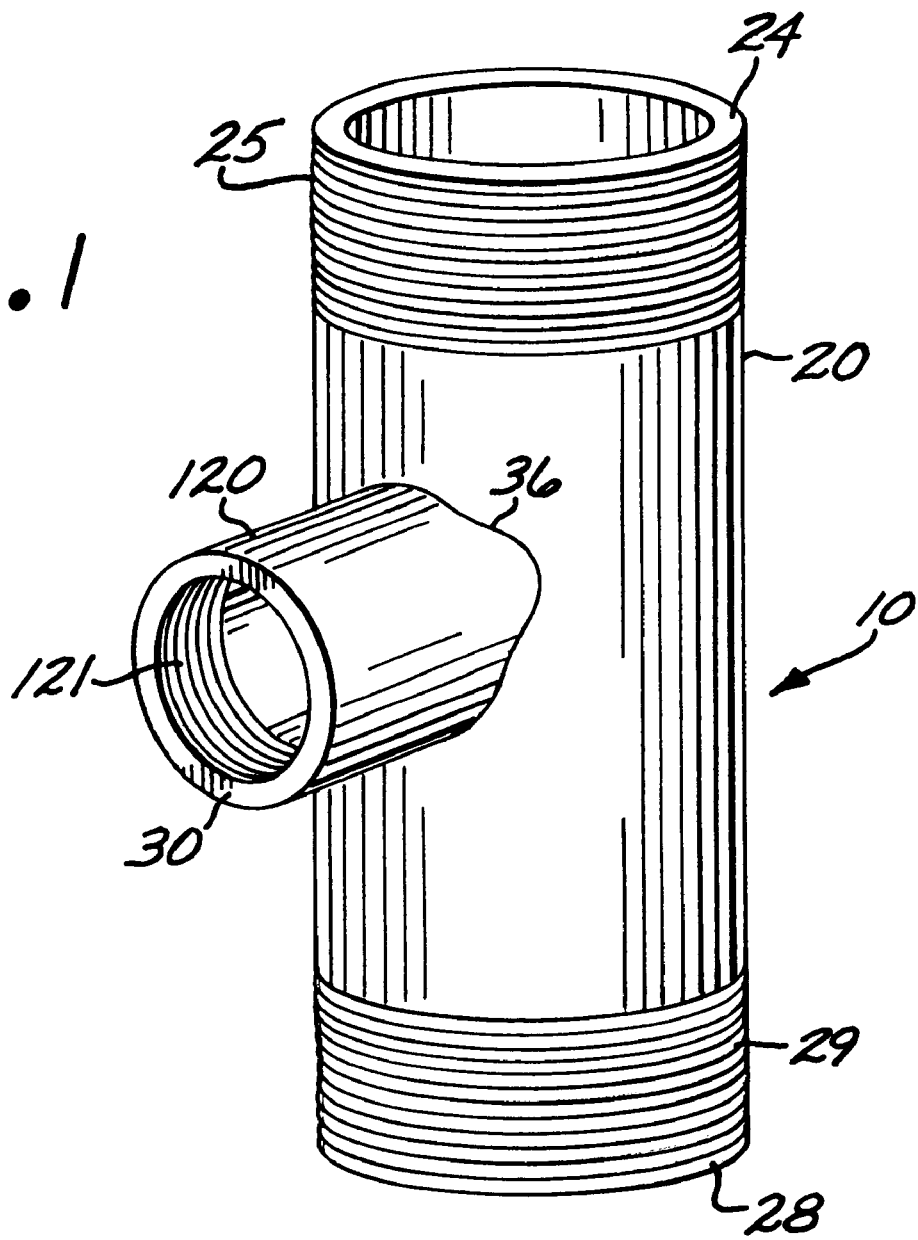
FIG. 1 is a perspective view of a bypass valve apparatus embodying the present invention.
Figure 4:
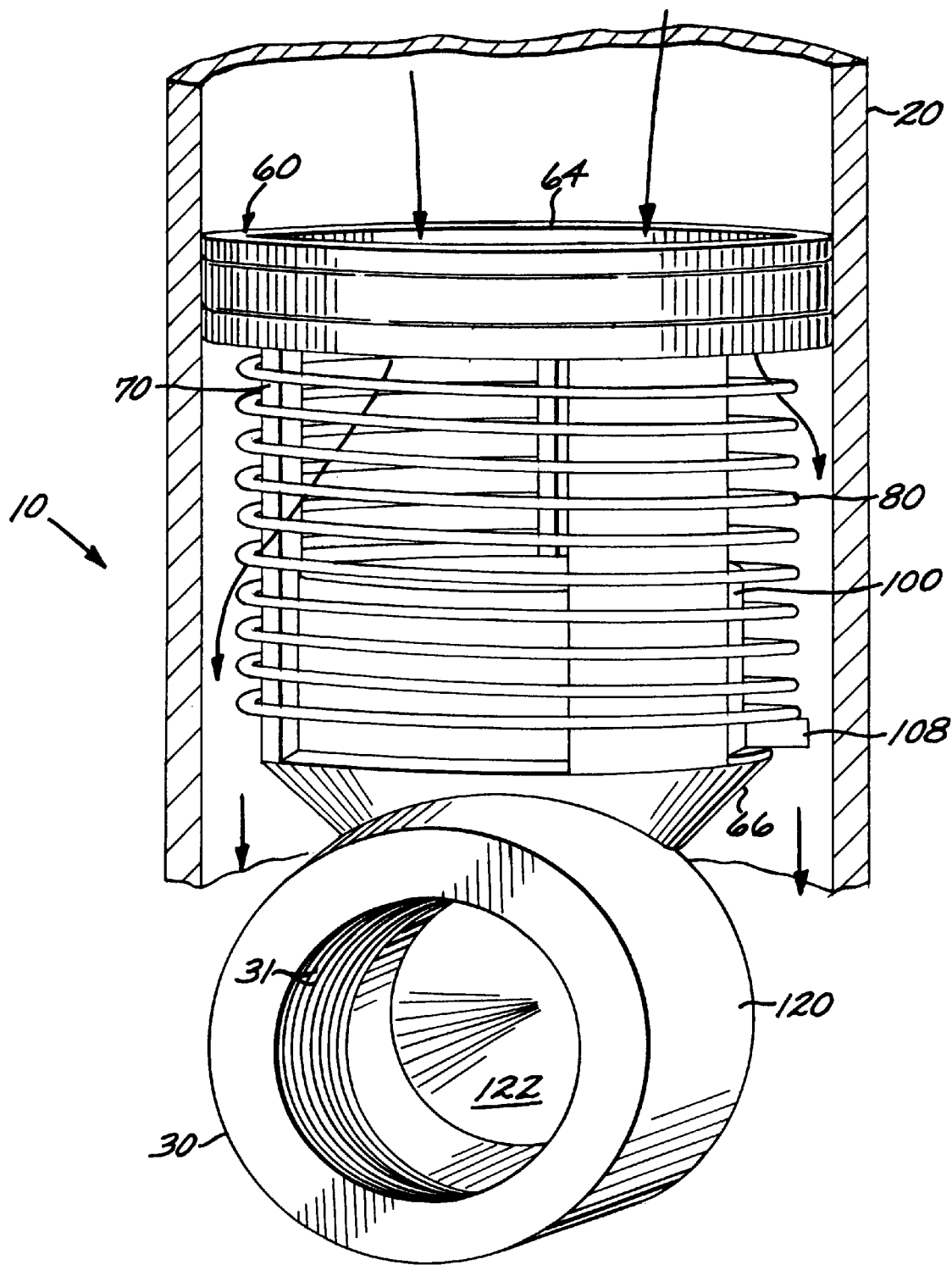
FIG. 4 is a perspective view, partially in cross section and in further enlarged scale, of the bypass valve of FIG. 1.

The bypass valve apparatus of the present invention provides a quick and convenient method to supply uninterrupted gas service to a consumer while servicing or replacing the gas meter installed on the consumer's main gas supply line. Referring to FIGS. 1 and 4, the preferred embodiment of the bypass valve, identified generally as 10, includes a cylindrical housing 20 with an inlet port 24, an outlet port 28, and an auxiliary port 30. A poppet cage 60 is mounted within the housing between the inlet and outlet ports and includes a coil spring 80. A poppet 100 is slidably disposed within the poppet cage. An auxiliary fitting 120 fluidly connects the auxiliary port with the poppet cage.

Figure 5:
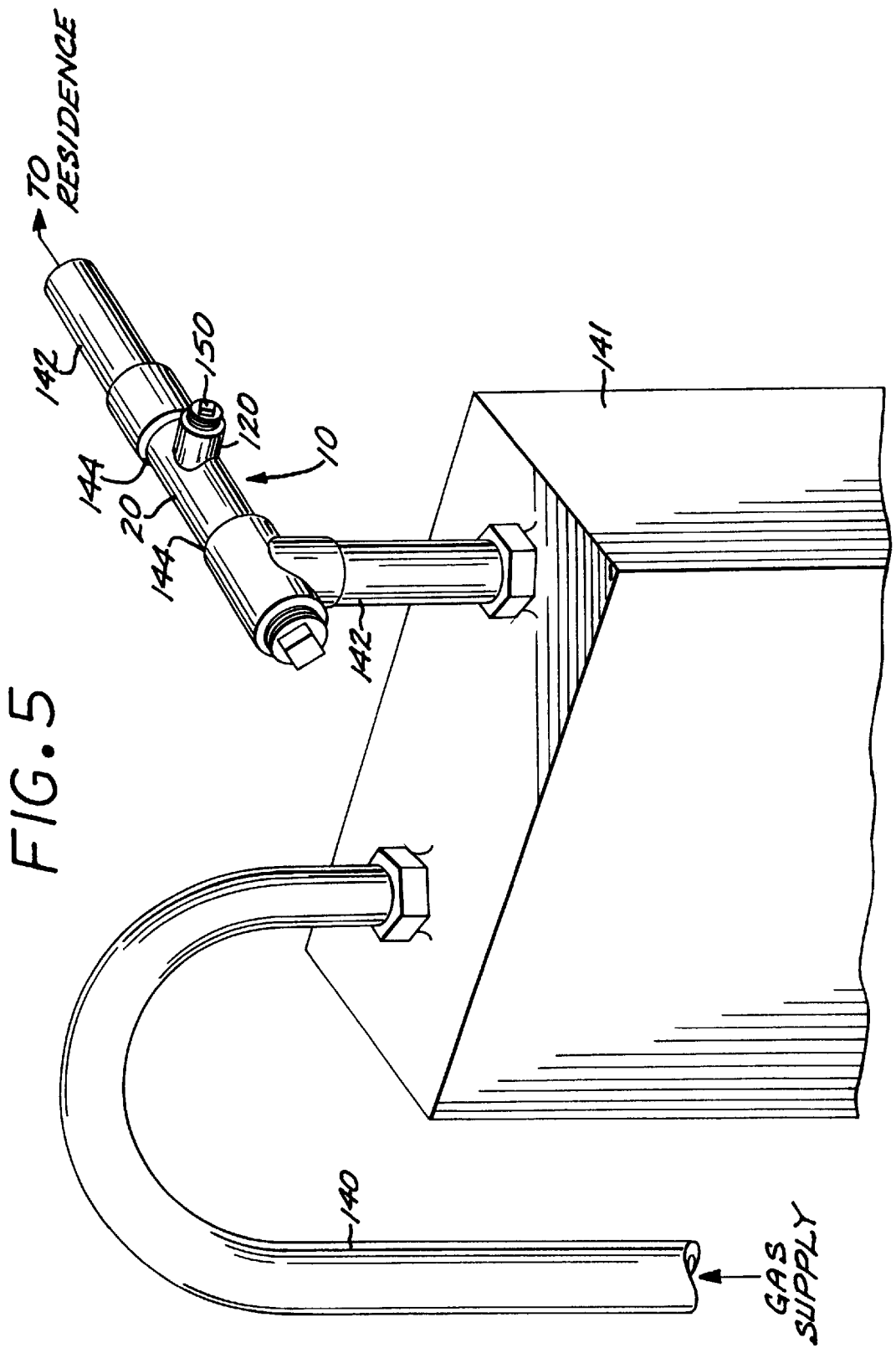
FIG. 5 is a perspective view, in reduced scale, of the bypass valve of FIG. 1 connected to a gas meter distribution line.

With continued reference to FIG. 1, the housing 20 is preferably formed from galvanized steel pipe of the type typically used in gas line installations to ensure compatibility and ease of installation using standard fittings. The inlet and outlet ports 24 and 28 are formed with outer threads 25 and 29, respectively, for coupling to a gas pipe 142 through standard sleeve fittings 144 (FIG. 5). The auxiliary port 30 is formed through a side bore 36 drilled in the housing 20. A fitting 120 extends orthogonally outward through the bore 36 and terminates with an open mouth formed with inner threads 121. A gas tight seal must be formed between the housing 20 and the fitting 120 extending through the bore 36, preferably by welding the fitting to the housing.

Figure 2:
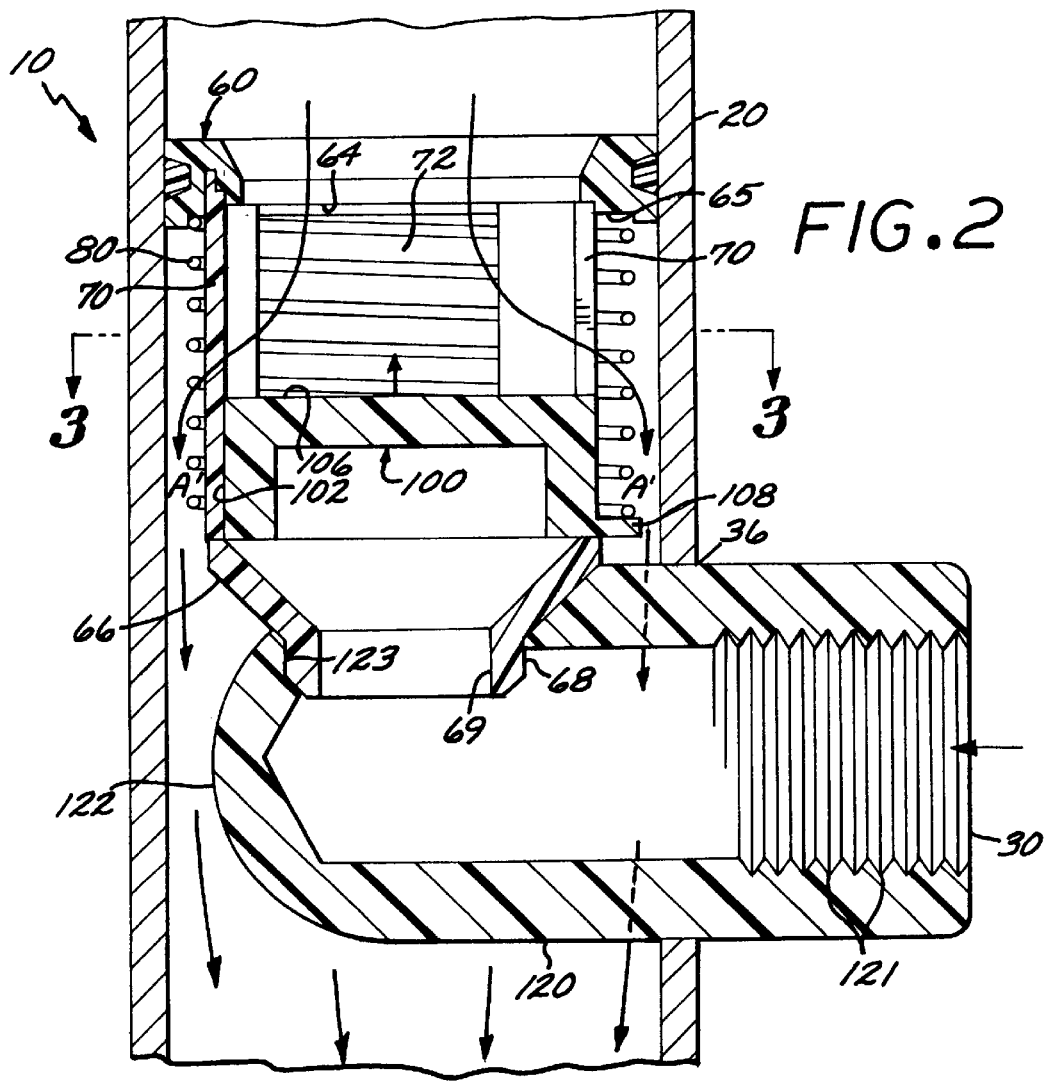
FIG. 2 is a cross sectional side view, in enlarged scale, of the bypass valve shown in FIG. 1.
Figure 3:
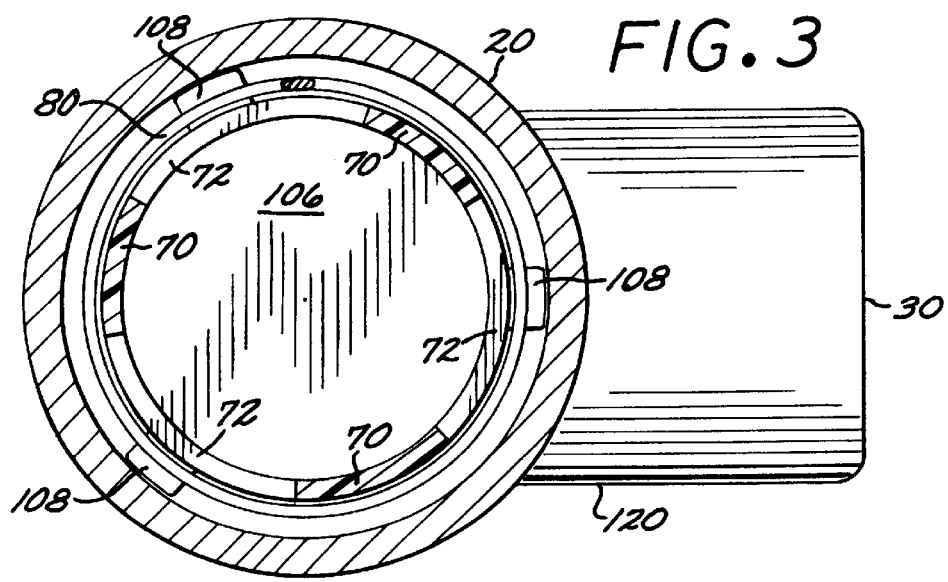
FIG. 3 is a cross sectional top view taken along line 3–3' of FIG. 2.

Referring now to FIGS. 2 and 3, the poppet cage 60 includes an annular inlet seat 64 and an annular outlet seat 66 spaced apart from the inlet seat by three axially elongated, laterally curved, axially aligned struts 70 spaced angularly equidistant from each other to define flow apertures 72 therebetween. The inlet seat 64 is formed with a central flow passage and a downward facing circumferential lip 65 for spacing the struts 70 from the inner wall of the housing 20 and defining an inlet seat inner diameter. The outlet seat 66 is formed in an inverted generally frustoconical configuration with a central passage and an integral, axially downward extending vertical nipple 68 with an axial bore formed therethrough and in confluence with the central passage to form an auxiliary inlet 69 into the cage 60. The inlet seat 64 is disposed in abutting concentric relationship with the inner wall of the housing 20 to form a gas tight seal therebetween and suspend the poppet cage 60 therefrom within the housing. The outlet seat 66 is formed with a smaller outer diameter than the inner diameter of the housing 20 and is therefore circumferentially spaced apart from the inner wall of the housing to permit the flow of gas therebetween. In the preferred embodiment the poppet cage 60 is formed from a plastic material such as Solvay K38 which is known to be compatible with natural gas.

Still referring to FIG. 2, the poppet 100 is formed in a cylindrical configuration with a cylindrical peripheral wall 102 surrounding an open core and a circular end wall 106 having a diameter larger than the inlet seat 64 inner diameter. The poppet 100 is disposed within the poppet cage between the inlet seat 64 and outlet seat 66 and in sliding relationship with the concave inner faces of the struts 70 which serve to guide movement of the poppet between the inlet and the outlet seats. The circular end wall 106 is disposed towards the inlet seat 64 to seal off the central flow passage when the poppet 100 is seated against the inner diameter of the inlet seat. The poppet 100 is further formed with three tabs 108 extending radially outward from the lower end of the peripheral wall 102 and one each through the flow apertures 72 so as not to impede the sliding movement of the poppet within the cage 60. The preferred embodiment of the poppet is also constructed of a plastic material compatible for use with natural gas.

As shown in FIG. 4, a coil spring 80 is interposed between the inlet seat 64 and outlet seat 66, being retained in position by the inlet seat lip 65 at its upper end and the poppet tabs 108 at its lower end so as to bias the poppet 100 against the outlet seat 66 and thereby seal off the auxiliary inlet. The spring 80 is disposed between the cage struts 70 and the inner wall of the housing 20 to circumferentially surround the poppet cage 60.

Referring once again to FIG. 2, the fitting 120 of the auxiliary port 30 is disposed orthogonally through the auxiliary bore 36 of the housing 20 and is formed with a closed inner end 122 spaced apart from the inner wall of the housing to permit gas flow therebetween. The fitting 120 is further formed with an auxiliary side bore 123 oriented axially upward to receive the nipple 68 of the outlet seat 66 therein and form a gas tight seal between the outlet seat and the fitting. In this manner the fitting 120 provides further support to the poppet cage 60 in addition to the suspension support provided by the inlet seat 64, and fluidly interconnects the auxiliary inlet 69 to the auxiliary port 30.

As shown in FIG. 5, in the preferred configuration and method of use, the bypass valve apparatus 10 of the present invention is mounted in line with the distribution line 142 of a gas meter 141 connected to a gas service line 140. The distribution line 142 supplies metered and pressure regulated gas to the consumer, and is coupled to the bypass valve 10 through standard fittings 144 that are threadingly engaged to the distribution line and the threaded ends 25 and 29 of the valve housing inlet and outlet ports 24 and 28, respectively (FIG. 1). During normal use, the valve 10 is inactive and a threaded plug 150 is coupled to the auxiliary port 30 to prevent the accumulation of dust, moisture, and other materials within the auxiliary fitting 120. The valve 10 is connected with the inlet port 24 toward the gas meter 141 and the outlet port 28 toward the consumer so that during normal operation gas supplied by the meter flows through the inlet port, passes through the inlet seat 64 and into the poppet cage 60, then courses out through the flow apertures 72, around the auxiliary fitting 120, out through the outlet port 28 and on to the consumer through the distribution line 142. The force of the spring 80 upon the poppet tabs 108 and the pressure of the flowing gas upon the poppet end wall 106 combine to urge the poppet 100 against the outlet seat 66, thereby sealing off the auxiliary inlet 69 formed therein. The spring 80 exerts a constant force upon the poppet 100 and thereby prevents any chattering of the poppet against the outlet seat that may be caused by fluctuations in the gas supply pressure or an excessive gas flow rate. In this manner, the auxiliary inlet is constantly sealed and thus no moisture or particulates that may be contained within the gas flow will be able to accumulate within the auxiliary fitting 120 or between the poppet 100 and the outlet seat 66, thereby ensuring that poppet seal functionality and integrity will be maintained over extended periods of time. In addition, the orthogonal relationship of the fitting 120 to the housing 20 serves to prevent the unauthorized diversion of gas from the line because the poppet cannot be physically contacted and thus urged from the outlet seat by any type of rod or screwdriver a person may attempt to insert into the fitting.

When the gas meter 141 is to be serviced or replaced, the plug 150 must first be removed from the auxiliary fitting 120 to expose the threaded mouth of the auxiliary port 30. An auxiliary gas source such as a bottle of compressed gas can then be coupled to the auxiliary port 30 and activated to provide a continuous, uninterrupted supply of gas to the consumer which ensures the consumer equipment pilot lights are not inadvertently extinguished. As soon as the auxiliary gas source commences to supply gas at a pressure higher than the combined pressure of the service line gas flow and the coil spring 80 upon the poppet 100 (typically no more than about 5 psi), the poppet 100 will be displaced by the auxiliary gas flow rushing through the fitting 120 and the auxiliary inlet 69 upward within the cage 60 to engage the inlet seat 64 and seal off the inlet central passage, thereby exposing the flow apertures 72 to the auxiliary gas flow, cutting off the service line gas flow and isolating the gas meter 141 from the consumer. The peripheral wall 102 of the poppet 100 will serve to maintain it in a vertical orientation while guiding it within the cage 60 along the inner surface of the struts 70, thus preventing any sticking or jamming of the poppet within the cage. In addition, the peripheral wall 102 and end wall 106 combine to form a downward facing pocket that serves to capture the incoming auxiliary gas and thus help to drive the poppet against the inlet seat 64.

Once the poppet 100 is seated against the inlet central passage, the auxiliary gas will continue to flow radially outward through the poppet cage flow apertures 72, course around the end 122 of the auxiliary fitting 120, and downstream out through the outlet port 28 and on to the consumer through the distribution line 142. Displacement of the poppet from the outlet seat 66 to the inlet seat 64 is a typically an instantaneous movement, and the gas supplied to the consumer experiences no fluctuations in pressure that may extinguish pilot lights or other critical flames. When the auxiliary gas flow has been established, the gas service line 140 can be throttled off and the meter 141 disconnected or disassembled for servicing. When the meter has been replaced or serviced, the gas service line can be reopened to establish pressure within the meter and in the distribution line leading to the bypass valve 10. At this point, the auxiliary gas source can be discontinued to allow the service gas flow and the coil spring 80 to drive the poppet 100 to once again seat against the auxiliary inlet 69 in the outlet seat 66, thereby sealing off the auxiliary port 30 and re-establishing gas flow from the gas meter to the consumer. The plug 150 is then coupled again to the threaded mouth of the fitting 120 to seal off the auxiliary port 30 and keep environmental contaminants from entering the fitting, at which time the procedure is complete and normal operation has been reestablished.

From the foregoing, it will be appreciated that the bypass valve apparatus of the present invention provides a quick, effortless, and very convenient method to service or replace a gas meter without interrupting the gas service to the consumer or requiring access to the consumer's gas appliances, and without the need to resort to cumbersome tubing and valving to ensure a continuous supply of gas to the consumer. The bypass valve is simple in design and thus reliable to operate, cost effective to produce, and easy to retrofit to existing installations.

While a particular embodiment of the invention has been illustrated and described, various modifications can be made without departing from the spirit and scope of the invention, and all such modifications and equivalents are contemplated by the disclosure, drawings and claims.

What is claimed is:

1. A bypass valve to be connected in line with a gas service line from a gas meter, comprising:
    a cylindrical housing formed with an inlet port and an axially opposed outlet port defining a flow chamber therebetween and including an auxiliary port adjacent said outlet and in fluid communication with said flow chamber;
    a poppet cage mounted within said flow chamber and formed with first and second confronting annular seats axially spaced apart to define a poppet chamber and laterally opening flow apertures, said first seat being disposed adjacent said inlet port and said second seat being in fluid communication with said auxiliary port;
    a poppet slidably disposed within said poppet chamber to, when said auxiliary port is pressurized to a predetermined pressure, be driven against said first seat to seal off said inlet port and direct gas flow from said auxiliary port past said second seat, through said flow apertures and out said outlet port; and
    a coil spring interposed between said first seat and said poppet to, when said auxiliary port pressure is below said predetermined pressure, bias said poppet against said second seat to seal off said auxiliary port and direct gas flow from said gas meter past said first seat, through said flow apertures and out said outlet port.

2. A bypass valve as set forth in claim 1, wherein:
    said poppet comprises a generally cylindrical axially projecting peripheral wall defining an open core and a circular end wall facing said first seat.

3. A bypass valve as set forth in claim 1, wherein:
    said poppet is formed with tabs extending through said flow apertures.

4. A bypass valve as set forth in claim 3, wherein:
    said tabs comprise lengths of wire extending radially outward through apertures formed in said poppet cylindrical wall.

5. A bypass valve as set forth in claim 2, wherein:
said poppet cage is generally cylindrical in shape.

6. A bypass valve as set forth in claim 1, further comprising:
a fitting fluidly interconnected between said auxiliary port and said second seat.

7. A bypass valve as set forth in claim 6, wherein:
said second seat is formed in an inverted frustoconical shape with the lower end coupled to said fitting.

8. A bypass valve as set forth in claim 7, wherein:
said fitting extends through said auxiliary port and terminates in a threaded nipple for coupling to an auxiliary gas source.

9. A bypass valve as set forth in claim 8, further comprising:
a threaded plug for engagement with said nipple.

10. A bypass valve as set forth in claim 1, wherein:
said first seat is attached to the inner wall of said housing to suspend said poppet cage therefrom.

11. A bypass valve as set forth in claim 1, wherein:
said poppet cage includes three axially aligned struts defining three said flow apertures therebetween.

12. A bypass valve as set forth in claim 1, wherein:
said housing is formed with external threads at said inlet and outlet ports for coupling with said gas service line.

13. A bypass valve as set forth in claim 3, wherein:
said spring is retained between said first seat and said tabs.

14. A bypass valve as set forth in claim 5, wherein:
said spring is disposed surrounding said poppet cage.

15. A bypass valve to be connected in line with a gas service line from a gas meter, comprising:
a housing formed with an inlet port, an outlet port, and an auxiliary port;
a poppet cage mounted within said housing and formed with first and second confronting annular seats spaced apart to define a poppet chamber and laterally opening flow apertures, said first seat being formed with an anchor and disposed adjacent said inlet port and second seat being in fluid communication with said auxiliary port;
a poppet slidably disposed within said poppet chamber to, when said auxiliary port is pressurized to a predetermined pressure, be driven against said first seat to seal off said inlet port and direct gas flow from said auxiliary port past said second seat, through said flow apertures and out said outlet port; and
a spring surrounding at least a portion of said poppet cage along its axial length and interposed between said anchor and said poppet to, when said auxiliary port pressure is below said predetermined pressure, bias said poppet against said second seat to seal off said auxiliary port and direct gas flow from said gas meter past said first seat, through said flow apertures and out said outlet port.

16. A bypass valve to be connected in line with a gas service line from a gas meter, comprising:
a housing formed with an inlet port, an outlet port, and an auxiliary port;
a poppet cage mounted within said housing and formed with first and second confronting annular seats spaced apart to define a poppet chamber and laterally opening flow apertures, said first seat being disposed adjacent said inlet port and said second seat being in fluid communication with said auxiliary port;
a poppet slidably disposed within said poppet chamber to, when said auxiliary port is pressurized to a predetermined pressure, be driven against said first seat to seal off said inlet port and direct gas flow from said auxiliary port past said second seat, through said flow apertures and out said outlet port; and
a biasing member mounted to said cage and cooperating with said poppet through said flow apertures to, when said auxiliary port pressure is below said predetermined pressure, bias said poppet against said second seat to seal off said auxiliary port and direct said gas flow from said gas meter past said first seat, through said flow apertures and out said outlet port.

17. A bypass valve as set forth in claim 1 wherein:
said laterally opening flow apertures are greater in axial length than said poppet.

* * * * *